Patented Oct. 8, 1935

2,016,521

UNITED STATES PATENT OFFICE 2,016,521

CONDENSATION PRODUCT OF THE CYANURIC SERIES AND A PROCESS OF PREPARING IT

Adolf Steindorff, Frankfort-on-the-Main-Hochst, and Max Paquin, Frankfort-on-the-Main, Germany, assignors to General Aniline Works, Inc., New York, N. Y., a corporation of Delaware No Drawing. Application October 30, 1931, Serial No. 572,220. In Germany November 10, 1930

14 Claims. (Cl. 260—27)

Our invention relates to new condensation products of compounds of aldehyde ammonia or aldehyde amine with compounds containing two amino-groups each of which may contain one substituent and both of which are united to a bivalent molecular group, such as C=O, C=S, C=NH, and to a process of preparing these new compounds.

We have found that new valuable condensation products are obtained by causing one molecular amount of a compound or a mixture of compounds of the following formula:

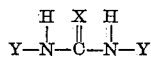

wherein, X means =O, =S or =NH and, Y means a hydrogen atom or an alkyl or aryl group, to react upon about two molecular amounts of a compound of the following formula:

wherein, Z means a hydrogen atom or an alkyl group and R means an alkyl group, one hydrogen atom of which may be substituted by a hydroxyl group or by an aromatic hydrocarbon group of the benzene series at a temperature of about 50° C. to about 90° C.

The condensation may be performed by merely fusing the reaction components or while adding an inert solvent, such as water or an organic solvent. Sometimes it is preferable to remove during the reaction the water formed by the condensation process. This can be effected either by adding to the mixture an organic solvent immiscible with water which forms with water an azeotropic mixture boiling between about 50° C. and about 90° C., such as benzene, and causing this mixture to evaporate at the reaction temperature in the same degree as water is formed during the reaction; in this case the water immiscible solvent must be added to the mixture in the same degree as it evaporates from the mixture; or, a water adsorbing agent, such as finely pulverized anhydrous sodium sulfate or anhydrous borax can be used in the presence of a solvent, provided that this water adsorbing agent is not soluble in or chemically affected by the solvent used.

The new compounds obtained by the process above described correspond to the following probable formula:

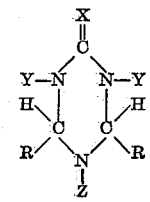

wherein, X means =O, =S or =NH, Y means a hydrogen atom or an alkyl or aryl group of the benzene series, Z means a hydrogen atom or an alkyl group, R means an alkyl group a hydrogen atom of which may be substituted by a hydroxyl group or an aromatic hydrocarbon group of the benzene series.

We wish to point out that this formula is a probable one and that in the following examples and claims, it is used to illustrate the compounds obtainable according to our new process.

Our new compounds are valuable intermediate products for the synthesis of different organic compounds, such as medicines. Furthermore, they are valuable assistants in the textile industry and fungicides and/or insecticides. They are well crystallizing products which melt under decomposition.

The following examples illustrate the invention, but they are not intended to limit it thereto the parts being by weight:

1. 600 parts of urea, 1340 parts of acetaldehyde ammonia (of 90 per cent. strength) of the probable formula:

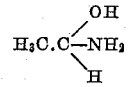

and 200 parts of water are heated together at 70° C.–75° C., while stirring. The condensation occurs with separation of water and a brisk evolution of ammonia. After 1½ hours, stirring is continued, while the mass is gradually cooling, during which operation the condensation product crystallizes. The product recrystallized from alcohol decomposes sharply at 190° C. The compound has the empirical formula $C_5H_{11}ON_3$ and probably is a symmetrical triazine of the formula:

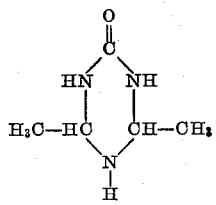

The determination of the molecular weight shows the latter to be 129 agreeing with this formula. The compound is readily soluble in water, rather sparingly soluble in alcohol and practically insoluble in benzene and ether. When boiled with water the compound hydrolyses to form urea, acetaldehyde and ammonia. The product cannot be reduced, and the nitroso-group cannot be introduced into it. It combines with bromine, but only so loosely that the bromine is set free even by means of potassium iodide.

Instead of acetaldehyde ammonia there can be used in the same manner the homologous propionaldehyde-ammonia or crotonaldehyde-ammonia having the probable formula:

$$H_3C.CH=CH.C\underset{H}{\overset{OH}{\diagup}}NH_2$$

2. 700 parts of thiourea are dissolved with aid of heat in one liter of water and 1340 parts of acetaldehyde ammonia (of 90 per cent. strength) are dissolved in 5 liters of water at 40° C.–50° C. These solutions are mixed and stirred at 65° C.–70° C. After a few minutes the crystallization of the condensation product, which is sparingly soluble, begins with evolution of ammonia. In order to complete the reaction, stirring is continued for 1½–2 hours at 70° C. The condensation product obtained is pure and decomposes sharply at 180° C. Analysis shows that the formula is $C_5H_{11}SN_3$. The product is sparingly soluble in water, very sparingly soluble in alcohol and insoluble in benzene and ether. The chemical properties correspond with those of the compound obtained as described in Example 1.

3. 550 parts of guanidine nitrate, 670 parts of acetaldehyde ammonia (of 90 per cent. strength) and 200 parts of water are together quickly heated to 70° C. A clear solution is obtained. After 20 minutes the crystallization of the condensation product sets in with a brisk evolution of ammonia. 100 parts of alcohol are added and the whole is stirred for ½ hour at 70° C. The product recrystallized from dilute alcohol decomposes at 156° C.–157° C. It is rather readily soluble in water, rather sparingly soluble in alcohol and nearly insoluble in benzene and ether. The chemical properties correspond with those of the compound obtained as described in Example 1.

4. 300 parts of urea, 990 parts of butyraldehyde ammonia (of 90 per cent. strength) of the probable formula:

$$H_3C.CH_2.CH_2.C\underset{H}{\overset{OH}{\diagup}}NH_2$$

and 100 parts of water are heated together at 80° C., while stirring. The reaction, which occurs with evolution of ammonia, is complete after about 1½ hours. The product obtained, probably a derivative of triazine, is filtered by suction after having been previously cooled.

5. 300 parts of urea, 1200 parts of aldol ammonia (of 88 per cent. strength) of the probable formula:

$$H_3C.CHOH.CH_2.C\underset{H}{\overset{OH}{\diagup}}NH_2$$

and 100 parts of water are together heated at 80° C.–85° C., while vigorously stirring. The reaction is complete after 2¼ hours and the product obtained, probably a derivative of triazine, separates after the solution has been cooled. The chemical properties correspond with those of the compound obtained as described in Example 1.

6. 880 parts of symmetric dimethyl-urea, 1360 parts of acetaldehyde-ammonia (of 90 per cent. strength), 1500 parts of methyl alcohol and 500 parts of finely pulverized anhydrous sodium sulfate are mixed together, while stirring, and the mixture is then boiled for about 1½ hours in a reflux apparatus. The condensation occurs with an evolution of ammonia. The dimethyl-triazine-condensation product obtained is isolated in known manner from the filtrate after the sodium sulfate has been filtered. Instead of dimethyl-urea there may be used in the same manner other aliphatically and aromatically substituted hymmetric ureas, such as diethyl urea, ethyl propyl urea, diphenyl urea or for instance ethyl phenyl urea.

7. 822 parts of phenyl acetaldehyde ammonia of the probable formula:

$$H_5C_6.CH_2.C\underset{H}{\overset{OH}{\diagup}}NH_2$$

180 parts of urea and 1000 parts of benzene are heated to boiling for about 3 hours. The water produced during the reaction is distilled with the benzene in the form of an azeotropic mixture, the quantity of benzene which distils being replaced by the addition of fresh benzene. After the benzene has been eliminated, the derivative of diphenyl triazine formed remains.

8. 600 parts of urea, 500 parts of the conversion product of acetaldehyde and methyl amine of the probable formula:

$$H_3C.C\underset{H}{\overset{OH}{\diagup}}N\underset{CH_3}{\overset{H}{\diagdown}}$$

800 parts of acetone and 500 parts of finely pulverized anhydrous borax are mixed together, while stirring and the mixture is boiled for about 2 hours in a reflux apparatus. After the borax has been filtered, the monomethylated derivative of triazine formed is isolated in known manner from the residue.

The structural formulæ given in the present application are, to the best of applicants' knowledge and belief, correct.

We claim:
1. The compounds of the following formula:

wherein
X means =O, =S or =NH,

Y means a hydrogen atom or an aliphatic or aromatic hydrocarbon group of the benzene series, Z means a hydrogen atom or an alkyl group, R means an alkyl group, a hydrogen atom of which may be substituted by a hydroxyl group or by an aromatic hydrocarbon group of the benzene series.

2. The compounds of the following formula:

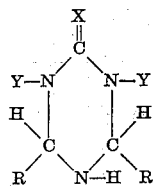

wherein

X means =O, =S or =NH,

Y means a hydrogen atom or an aliphatic or aromatic hydrocarbon group of the benzene series, R means an alkyl group, a hydrogen atom of which may be substituted by a hydroxyl group or by an aromatic hydrocarbon group of the benzene series.

3. The compounds of the following formula:

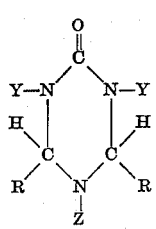

wherein

Y means a hydrogen atom or an aliphatic or aromatic hydrocarbon group,

Z means a hydrogen atom or an alkyl group of the benzene series,

R means an alkyl group, a hydrogen atom of which may be substituted by a hydroxyl group or by an aromatic hydrocarbon group of the benzene series.

4. The compounds of the following formula:

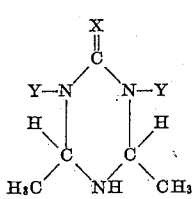

wherein

X means =O, =S or =NH,

Y means a hydrogen atom or an aliphatic or aromatic hydrocarbon group of the benzene series.

5. The compounds of the following formula:

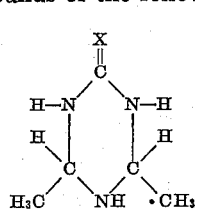

wherein

X means =O, =S or =NH,

6. The dimethyltriazine of the following formula:

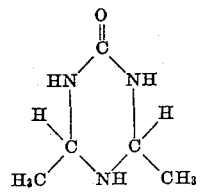

this compound being a well crystallizing substance, decomposing at 190° C., being readily soluble in water, difficultly soluble in alcohol, nearly insoluble in ether and benzene.

7. The process which comprises reacting with one molecular amount of compounds of the formula:

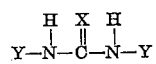

wherein

X means =O, =S or =NH and

Y means a hydrogen atom or an aliphatic or aromatic hydrocarbon group of the benzene series, upon about two molecular amounts of a compound of the following formula:

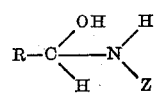

wherein

Z means a hydrogen atom or an alkyl group and

R means an alkyl group, one hydrogen atom of which may be substituted by a hydroxyl group or by an aromatic hydrocarbon group of the benzene series at a temperature of between about 50° C. and about 90° C.

8. The process which comprises reacting with one molecular amount of compounds of the formula:

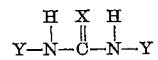

wherein

X means =O, =S or =NH and

Y means a hydrogen atom or an aliphatic or aromatic hydrocarbon group of the benzene series upon about two molecular amounts of a compound of the following formula:

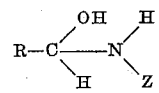

wherein

Z means a hydrogen atom or an alkyl group and

R means an alkyl group, one hydrogen atom of which may be substituted by a hydroxyl group or by an aromatic hydrocarbon group of the benzene series at a temperature of between about 50° C. and about 90° C. with the addition of water.

9. The process which comprises reacting with one molecular amount of compounds of the formula:

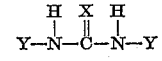

wherein

X means =O, =S or =NH and

Y means a hydrogen atom or an aliphatic or aromatic hydrocarbon group of the benzene series upon about two molecular amounts of a compound of the following formula:

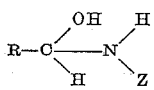

wherein

Z means a hydrogen atom or an alkyl group and

R means an alkyl group, one hydrogen atom of which may be substituted by a hydroxyl group or by an aromatic hydrocarbon group of the benzene series at a temperature of between about 50° C. and about 90° C., while adding an inert organic solvent.

10. The process which comprises reacting with one molecular amount of compounds of the formula:

$$Y-\underset{H}{N}-\underset{\|}{\overset{X}{C}}-\underset{H}{N}-Y$$

wherein

X means =O, =S or =NH and

Y means a hydrogen atom or an aliphatic or aromatic hydrocarbon group of the benzene series upon about two molecular amounts of a compound of the following formula:

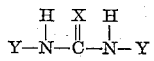

wherein

Z means a hydrogen atom or an alkyl group and

R means an alkyl group, one hydrogen atom of which may be substituted by a hydroxyl group or by an aromatic hydrocarbon group of the benzene series at a temperature of between about 50° C. and about 90° C., with the addition of an inert organic solvent which is insoluble in water and forms an azeotropic mixture with water boiling at the reaction temperature, distilling off this azeotropic mixture in the same degree as the water is formed during the reaction, and adding the solvent in the same degree as it evaporates.

11. The process which comprises reacting with one molecular amount of compounds of the formula:

$$Y-\underset{H}{N}-\underset{\|}{\overset{X}{C}}-\underset{H}{N}-Y$$

wherein

X means =O, =S or =NH and

Y means a hydrogen atom or an aliphatic or aromatic hydrocarbon group of the benzene series upon about two molecular amounts of a compound of the following formula:

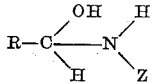

wherein

Z means a hydrogen atom or an alkyl group and

R means an alkyl group, one hydrogen atom of which may be substituted by a hydroxyl group or by an aromatic hydrocarbon group of the benzene series at a temperature of between about 50° C. and about 90° C., with the addition of benzene, distilling off the azeotropic mixture of benzene and water in the same degree as the water is formed during the reaction, and adding the benzene in the same degree as it evaporates.

12. The process which comprises reacting with one molecular amount of compounds of the formula:

$$Y-\underset{H}{N}-\underset{\|}{\overset{X}{C}}-\underset{H}{N}-Y$$

wherein

X means =O, =S or =NH and

Y means a hydrogen atom or an aliphatic or aromatic hydrocarbon group of the benzene series upon about two molecular amounts of a compound of the following formula:

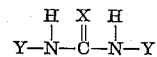

wherein

Z means a hydrogen atom or an alkyl group and

R means an alkyl group, one hydrogen atom of which may be substituted by a hydroxyl group or by an aromatic hydrocarbon group of the benzene series at a temperature of between about 50° C. and about 90° C. with the addition of an inert organic solvent and a water absorbing agent which is insoluble in the solvent.

13. The process which comprises reacting with one molecular amount of compounds of the formula:

$$Y-\underset{H}{N}-\underset{\|}{\overset{X}{C}}-\underset{H}{N}-Y$$

wherein

X means =O, =S or =NH and

Y means a hydrogen atom or an aliphatic or aromatic hydrocarbon group of the benzene series upon about two molecular amounts of a compound of the following formula:

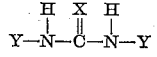

wherein

Z means a hydrogen atom or an alkyl group and

R means an alkyl group, one hydrogen atom of which may be substituted by a hydroxyl group or by an aromatic hydrocarbon group of the benzene series at a temperature of between about 50° C. and about 90° C., with the addition of alcohol and anhydrous sodium sulfate.

14. The process which comprises acting with 1340 parts of acetaldehyde ammonia of 90% strength upon about 600 parts of urea in the presence of about 200 parts of water at a temperature of about 70° C. to about 75° C.

ADOLF STEINDORFF.
MAX PAQUIN.